US011232877B2

United States Patent
Rico Arenal et al.

(10) Patent No.: US 11,232,877 B2
(45) Date of Patent: Jan. 25, 2022

(54) SYSTEM FOR STORING RADIOACTIVE MATERIALS

(71) Applicant: INGECID, INVESTIGACIÓN Y DESARROLLO DE PROYECTOS S.L., Boo de Piélagos (ES)

(72) Inventors: Jokin Rico Arenal, Santander (ES); Francisco Ballester Muñoz, Santander (ES)

(73) Assignee: INGECID, INVESTIGACIÓN Y DESARROLLO DE PROYECTOS S.L., Boo de Piélagos (ES)

(*) Notice: Subject to any disclaimer, the term of this patent is extended or adjusted under 35 U.S.C. 154(b) by 0 days.

(21) Appl. No.: 17/258,176

(22) PCT Filed: Jul. 1, 2019

(86) PCT No.: PCT/ES2019/070462
§ 371 (c)(1),
(2) Date: Jan. 6, 2021

(87) PCT Pub. No.: WO2020/016466
PCT Pub. Date: Jan. 23, 2020

(65) Prior Publication Data
US 2021/0202123 A1 Jul. 1, 2021

(30) Foreign Application Priority Data
Jul. 15, 2018 (ES) ................. ES201830710

(51) Int. Cl.
G21F 5/10 (2006.01)
G21F 5/12 (2006.01)
(Continued)

(52) U.S. Cl.
CPC ................. *G21F 5/10* (2013.01); *G21C 7/32* (2013.01); *G21C 15/22* (2013.01); *G21C 19/04* (2013.01);
(Continued)

(58) Field of Classification Search
CPC ... G21F 5/10; G21F 5/12; G21F 5/005; G21F 5/015; G21F 1/04; G21C 7/32; G21C 15/22; G21C 19/04
(Continued)

(56) References Cited

U.S. PATENT DOCUMENTS 8,798,224 B2 8/2014 Singh
2012/0037632 A1 2/2012 Singh et al.
(Continued)

FOREIGN PATENT DOCUMENTS

ES 2296522 A1 4/2008
ES 2344290 A1 8/2010
(Continued)

*Primary Examiner* — Kiet T Nguyen
(74) *Attorney, Agent, or Firm* — Soroker Agmon Nordman

(57) ABSTRACT

System for storing radioactive materials comprising: —a canister (4) containing radioactive waste; —a container (C), provided with a casing (1), a base (2) and a cover (3), and a passive helicoidal convection-based ventilation system provided with: lower air inlets (5); an area (6) of air circulation between the canister (4) and the inner surface of the container (C), and upper air outlets (7); the inlets (5) and outlets (7) have a decreasing variation of section in the direction of air circulation, are curved and facing an oblique direction with respect to the radial direction of the container, the air between said inlets (5) and outlets (7) describing an upward helicoidal path around the capsule or canister (4).

7 Claims, 3 Drawing Sheets

(51) Int. Cl.
　　　*G21F 5/005*　　　(2006.01)
　　　*G21F 5/015*　　　(2006.01)
　　　*G21F 1/04*　　　(2006.01)
　　　*G21C 15/22*　　　(2006.01)
　　　*G21C 7/32*　　　(2006.01)
　　　*G21C 19/04*　　　(2006.01)

(52) U.S. Cl.
　　　CPC ............... *G21F 1/04* (2013.01); *G21F 5/005* (2013.01); *G21F 5/015* (2013.01); *G21F 5/12* (2013.01)

(58) Field of Classification Search
　　　USPC .............................. 250/506.1; 376/272, 260
　　　See application file for complete search history.

(56) References Cited

U.S. PATENT DOCUMENTS

| | | | |
|---|---|---|---|
| 2019/0103197 A1* | 4/2019 | Singh | G21F 5/005 |
| 2021/0057118 A1* | 2/2021 | Singh | G21F 5/012 |
| 2021/0225537 A1* | 7/2021 | Singh | G21F 3/00 |
| 2021/0280332 A1* | 9/2021 | Singh | G21F 5/012 |

FOREIGN PATENT DOCUMENTS

| | | | |
|---|---|---|---|
| JP | 2000275396 A | 10/2000 |
| WO | 2010129767 A2 | 11/2010 |
| WO | 2013115881 A2 | 8/2013 |
| WO | 2017165180 A1 | 9/2017 |

\* cited by examiner

SYSTEM FOR STORING RADIOACTIVE MATERIALS

OBJECT OF THE INVENTION

The object of the invention is a system for storing radioactive materials comprising: a capsule or canister containing radioactive materials; an outer container housing the said canister; and a ventilation system provided with air inlets and outlets configured in the container to ensure upward helicoidal convection-based ventilation within the container and around the said canister.

The invention also includes a specific container, configured by a continuous succession of materials, expressly arranged to optimise the efficiency of gamma and neutron radiation shielding.

TECHNICAL FIELD OF THE INVENTION

This invention is applicable in the radioactive waste storage sector, for example, from nuclear plants, such as: spent fuel, activated materials or others that can be considered as a source of radioactive emission.

STATE OF THE ART

Different background is known for radioactive waste storage devices that have a ventilation system provided with air inlets from the outside and air outlets for the evacuation of heat released by the radioactive emission source.

Background of radioactive waste storage devices provided with a body with different layers for radiation shielding is also known.

Specifically, document JP2000275396A describes a container made from concrete housing a canister storing the spent fuel. Air is introduced from the bottom of the container and passes around the canister to cool the hot fuel. The container is made up of a removable inner cylinder and an outer cylinder.

Document U.S. Pat. No. 8,798,224 describes a container with ventilation system with several inlets and outlets. The outlets start from the inner area of the cover and end in the outer part. The air inlets have the section on the inner and outer surface aligned. There are two ducts describing a circumferential trajectory therebetween. The gap between shells is filled with radiation shielding material.

Passive ventilation systems currently used in radioactive waste storage devices have rectilinear air inlets and outlets, or square constant section inlets following the generatrix of a cylinder. All of them generate a vertical upward flow of air inside, which promotes the existence of areas with a lack of air flow in which temperature increases occur due to the accumulation of heat released by the radioactive material.

Additionally, these inlets and outlets, due to their geometry and arrangement, cause a drastic decrease in the shielding of those devices with a multilayer system of material, due to the presence of said openings.

In the state of the art, there are containers or shielding against radiation by means of concretes that provide shielding against only one type of (gamma or neutron) radiation, not being effective in protection against another type of radiations.

Concrete is a material made of a matrix of cement paste into which aggregates are embedded. Concrete for radiation shielding must contain materials that attenuate gamma (photon) radiation and neutron radiation. Concrete for radiation shielding is known to be used in nuclear power plants, radiotherapy hospitals, nuclear research centres and containers for the storage of radioactive waste; in these cases, concrete containing high density aggregates, suitable for shielding against gamma radiation, together with aggregates with high hydrogen content and components containing boron, composition (hydrogen+boron) suitable for shielding against neutron radiation, are used, with hydrogen acting as fast-neutron attenuator-moderator and boron acting as neutron absorber. However, it is a single concrete block that jointly contains these materials to shield both (neutron and photon) radiations and that seeks a balance in the combination of these materials.

Spanish patent ES2296522 claims a gamma radiation protection by means of a heavy mass with high density aggregates, such as magnetite.

Spanish patent ES2344290 describes a protection against neutron radiation by means of a mass of cement mixed with calcium sulphate, aggregates, water and chemical additives. With this mass, bricks, poured concrete or other material providing this protection against this type of radiation are manufactured.

The problem with known solutions is that both types of (gamma and neutron) radiations require different and opposite solutions, since materials that shield against gamma radiation are not appropriate and imply a detriment to the shielding of neutron radiation, and vice versa.

DESCRIPTION OF THE INVENTION

The invention relates to a system for storing radioactive materials comprising: a canister carrying the radioactive waste; a ventilation system; and an outer container, comprising a base, a vertically projected case and a cover, said container delimiting a cavity for housing the canister containing the radioactive waste; and having characteristics oriented to solving the drawbacks of the aforementioned background.

An object of the invention is the development of a system for storing radioactive materials having an improved convection-based ventilation system, capable of ensuring air circulation throughout the entire space between the canister containing the radioactive waste and the outer container, avoiding both heating points and that the inlets and outlets of the ventilation system represent a drastic decrease in the radiation shielding of the container.

Another object of the invention is a container specific to the storage system, with a specialisation of concretes that allows improving the efficiency of the shielding of said container, so that the multilayer combination of concretes manages to shield both gamma radiations and neutron radiations.

The storage system incorporates a passive helicoidal convection-based ventilation system, configured by:
 air inlets at the base of the container, which pass through the container wall;
 a helicoidal upward air circulation area between the canister and the outer container; and
 air outlets through a wall of the cover, which can also pass through the horizontal surfaces thereof.

According to the invention, at least the air inlets have a decreasing section variation, in the direction of air circulation therethrough; i.e., a decreasing section in the direction of air entry into the container, and optionally the outlets having a decreasing section in the direction of air exit.

This variation in section causes, due to Venturi effect, a gradient of pressures and velocities, at least, in the incoming air flow, promoting both the entry of air into the container and its subsequent exit to the outside.

These inlets and outlets, in addition to the aforementioned decreasing variation in section in the direction of air circulation, face an oblique direction with respect to the radial direction of the container, causing the air to describe between the inlets and the outlets a convection-based upward helicoidal path around the canister; ensuring a helicoidal circulation of air throughout the entire space between the canister and the inner surface of the container.

According to the invention, each of the air inlets and outlets have an outer mouth and an inner mouth, which are laterally out of alignment and which, preferably, are also geometrically arranged at different elevations or heights.

In this way, the outer and inner mouths, of a same inlet or outlet, are arranged offset both radially and in height, and this design prevents a drastic decrease in the shielding provided by the container.

Therefore, the ventilation system consists of a passive helicoidal convection-based ventilation system thanks to the design of the air inlets and outlets, which improves the circulation of air inside the container that generates a Venturi effect and, in addition, avoids a drastic decrease in the shielding of the container due to the presence of said openings.

The helicoidal upward flow of air ensures air circulation throughout the area between the canister and the inner surface of the container, improving heat transfer from the canister to the outside and avoiding the existence of areas without air circulation and overheating.

In addition, both the orientation of the air inlets and outlets and their design provide high hydraulic efficiency and thus a thermal improvement. In this way, direct radiation passing through said inlets and outlets from the radioactive source, contained in the canister, to the outside of the container is minimised. This is achieved by:
  the curved shape of the inlets orienting the air flow causing an upward helicoidal path;
  the function of the curved shape of the outlets, with a geometry similar to that of the inlet, placing the largest section inside the duct, promoting the channeling of air to the outside;
  the design of its inlet and outlet mouths out of alignment.

This invention includes a specific container, in which the casing, the cover and the base of the container are configured with several layers, multilayer, of concretes specialised in the shielding of different types of radiations; for this purpose, several layers, each of different material, or of the same material with different compositions, are arranged. This achieves another object of the invention, which is to configure a container with optimal gamma and neutron radiation shielding, by combining different layers of concrete, each of which being intended for the shielding of a type of radiation.

The storage of radioactive materials requires that the systems used to house them inside be constructed of materials capable of making the radiation outside them as low as possible. The main radiations that must be shielded by the storage container are gamma radiation and neutron radiation.

The container is intended to contain the canister, configured by a continuous succession of materials, expressly arranged to optimise the efficiency of gamma and neutron radiation shielding from the radioactive material housed in the canister.

In one embodiment, said container comprises a casing with at least one steel shell that serves, among other functions, as permanent formwork to the multilayer system of concretes specialised in gamma radiation and neutron radiation shielding.

Other configurations could be provided, such as several concentric shells with different radii, housing inside the specialised concretes; or, two shells, one external, analogous to the previous one, and the other external configuring the inner surface of the container.

The cover consists of a metal structure that contains the free accesses of the air circulating inside the container, helping the evacuation to the outside of the air flow circulating inside the container. This structure serves as a permanent formwork for the subsequent concreting of the same.

The container base has a peripheral portion with a structure analogous to the sidewall of the container casing and a steel plate closing the assembly and forming a container support surface for an upright position.

With regard to the multilayer system, the container of the invention differs from the existing solutions in that the arrangement and specialisation of the concretes are identified, each of them being resistant to high temperatures, being dosed and positioned in the container in a specific way, each of them having a function, allowing to achieve a quantitative improvement in the shielding against gamma and neutron radiations coming from the radioactive source.

The multilayer effect of the container cover is achieved by phased differentiated concreting, which allows the non-homogeneity of the different layers that make it up.

This multilayer system may have a variable number of layers of different materials, or the same material with different compositions.

According to the invention, the multilayer container of the storage system comprises: —at least one layer of high-density specialised concrete, which includes in its dosing high-density aggregates to shield gamma radiation and reduce the energy of part of neutron radiation, and; —at least one other layer of neutron radiation specialised concrete, which reduces the energy of neutron radiation (thermalisation) and absorbs much of it, and which includes in its dosing aggregates with high-hydrogen content and aggregates with a significant content of a neutron absorber; the layer of concrete specialised in the shielding against gamma radiation being preferably arranged between the canister and the concrete specialised in the shielding against neutron radiation.

The specialised concrete layer for shielding against gamma radiation is a material medium that, due to its high density, blocks all or part of the photons coming from the radiation source, based on the interaction mechanisms of gamma radiation with matter: photoelectric effect (low energy photons), Compton effect (intermediate energy photons) and pair creation (very high energy photons).

The aim of neutron shielding is to block all or part of the neutrons coming from the radiation source. For this purpose, this container comprises a combination of materials that act as fast-neutron moderators and as neutron braking or thermalisation, highly hydrogenated materials (water, paraffin, polymeric fibres), with others that act as absorbers, which capture neutrons.

These neutron shields are based on the mechanisms of interaction of neutron radiation with matter: collisions (fast-neutron braking, thermalisation) and nuclear reactions—absorption or fission—(capture of neutrons).

The characteristics of the invention will be more readily understood in view of the example embodiment shown in the accompanying drawings described below.

DESCRIPTION OF THE FIGURES

In order to complement the description that is being carried out and with the purpose of facilitating the understanding of the characteristics of the invention, the present description is accompanied by a set of drawings wherein, by way of a non-limiting example, the following has been represented.

PREFERRED EMBODIMENT OF THE INVENTION

Figure 1:
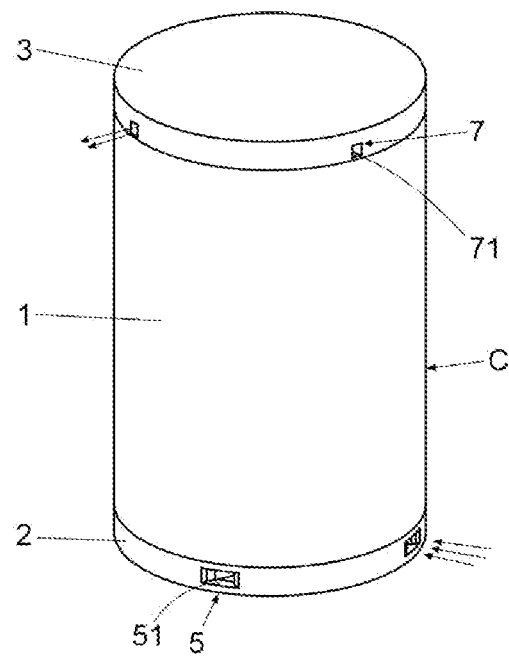
FIG. 1 shows a perspective view of one embodiment example of the system for storing radioactive materials according to the invention.
Figure 2:
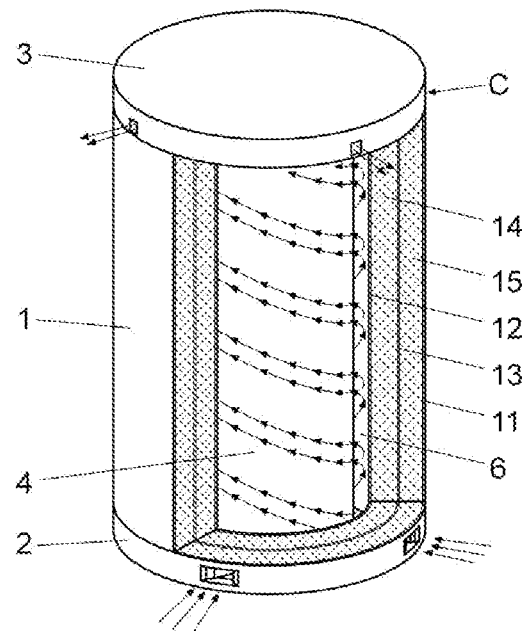
FIG. 2 shows a view analogous to the previous one in which a side portion of the container housing the canister has been sectioned.

As can be seen in FIG. 1, the system for storing radioactive materials, object of this invention, comprises a container (C) with a casing (1), a base (2) and a cover (3) that delimit a cavity for housing a canister (4) visible in FIG. 2, containing radioactive waste.

Figure 3:
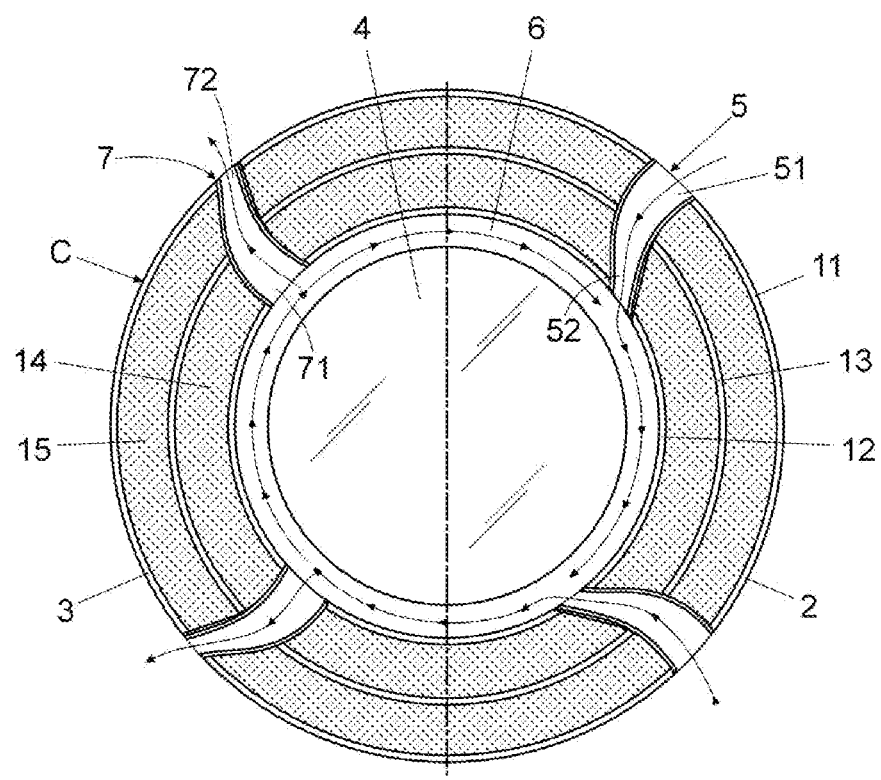
FIG. 3 shows a schematic plan view of the system of the previous figures in which the right half of the container has been sectioned by a horizontal plane cutting the lower inlets of the ventilation system, and the left half by a horizontal plane cutting the upper outlets of the ventilation system.

In FIGS. 2 and 3, the passive helicoidal convection-based ventilation system is seen provided with: air inlets (5) defined in the base (2) of the container (C); an area (6) of helicoidal circulation of air in an upward direction comprised between the canister (4) and the casing (1) of the container (C), and air outlets (7) to the outside, comprised in the cover (3).

In FIG. 3, the inlets (5) have an outer mouth (51) and an inner mouth (52), having a decreasing variation in section in the direction of air entry; while the outlets (7) have an inner mouth (71) and an outer mouth (72) that also have a decreasing section in the direction of air exit inside them.

In said FIG. 3, the inlets (5) and the outlets (7) face an oblique direction with respect to the radial direction of the container, that is, with a tangential component, so that the circulation of air inside the container (C), between the inlets (5) and the outlets (7), defines an upward helicoidal path around the canister (4), as depicted in FIG. 2.

Figure 4:
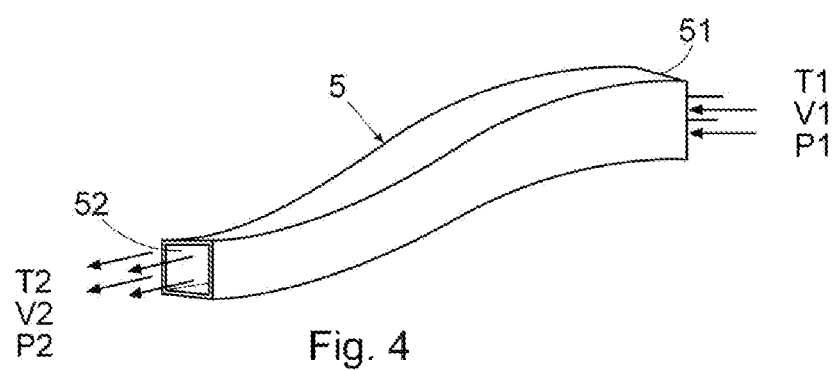
FIG. 4 shows a perspective view of one on the air inlets of the ventilation system.
Figure 6:
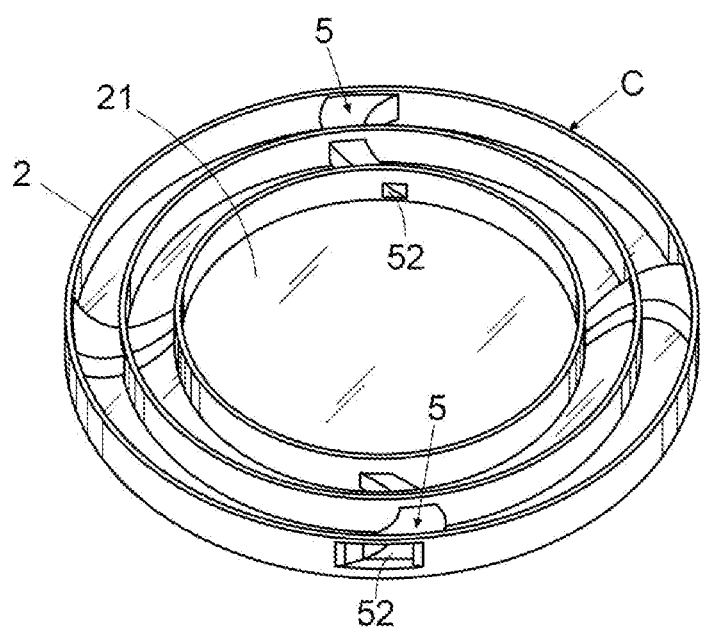
FIG. 6 shows a schematic perspective view of the metal structure of the base, in which the arrangement of the air inlets of the ventilation system can be seen.

As can be seen in FIGS. 4 and 6, the outer mouth (51) and the inner mouth (52) of the inlet (5) are geometrically arranged at different elevation or height.

This variation in section causes, due to Venturi effect, a gradient of pressures and velocities in the incoming and outcoming air flow, promoting both the entry of air into the system and its subsequent exit to the outside. Specifically, at the inlet (5) there is an increase in the velocity (V2>V1) and a decrease in the pressure (P2<P1) and in the temperature (T2<T1) of the circulating air.

Figure 5:
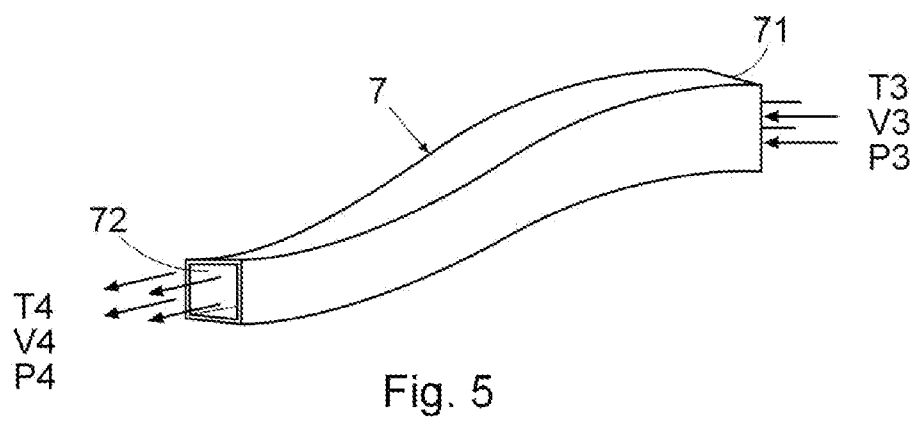
FIG. 5 shows a perspective view of one on the air outlets of the ventilation system.

Similarly, as shown in FIG. 5, the inner mouth (71) and outer mouth (72) of the outlets (7) are also at different elevation or height, producing in them an increase in the velocity (V4>V3) and a decrease in the pressure (P4<P3) and in the temperature (T4<T3) of the circulating air.

As can be seen in FIGS. 2 and 3, the casing (1) of the container (C) comprises in this exemplary embodiment: an outer shell (11), an inner shell (12) and an intermediate shell (13), all of steel, and which form a permanent formwork for a high-density concrete layer (14), specialised to shield gamma radiation and reduce the energy of part of the neutron radiation; and another concrete layer (15) specialised to shield neutron radiation and, preferably, arranged externally with respect to the first concrete layer (14).

The high-density concrete layer (14), specialised to shield gamma radiation and reduce the energy of part of the neutron radiation, includes in its dosage high density aggregates; in this specific case iron minerals, for example: hematite, ilmenite, lepidocrocite, goethite, limonite, magnetite or the like.

The concrete layer (15), specialised in neutron radiation, includes in its dosage aggregates with high hydrogen content which, for example, may be of: serpentine, limonite, goethite, bauxite or the like; and aggregates with a significant content of a neutron absorber, which may be of: colemanite, boron calcite, ferro boron, boron frit, witherite or the like.

Thus, the concrete layer (14), specialised against gamma radiation, is arranged between the radioactive source contained in the canister (4) and the other concrete layer (15), specialised in shielding against neutron radiation.

As can be seen in FIG. 2, the base (2) of the container (C) has a peripheral portion with a layered structure analogous to the wall of the casing (1) and has a closing plate (21), depicted in FIG. 6, which forms a surface for supporting a canister (4), located vertically inside the container.

The cover (3) of the container (C) has a metal structure, similar to that of the base (2) and contains the outlets (7) of the ventilation system, forming a permanent formwork for the differentiated concreting thereof with concretes specialised against radiation, analogous to those used in the casing (1).

Once the nature of the invention as well as an example of preferred embodiment have been sufficiently described, it is stated for all pertinent purposes that the materials, form, size and arrangement of the elements described are susceptible to changes, provided these do not involve an alteration of the essential features of the invention which are claimed below.

The invention claimed is:

1. A system for storing radioactive materials, comprising: a canister (4) containing radioactive waste; a container (C) provided with a casing (1), a base (2), and a cover (3), said container (C) delimiting a cavity for housing the canister (4); and a convection-based ventilation system provided with lower air inlets (5), an area (6) of upward air circulation defined between the canister (4) and the inner surface of the storage container, and upper air outlets (7); characterized in that the ventilation system consists of a passive helicoidal convection-based ventilation system, in which the inlets (5) and outlets (7) of the ventilation system have an outer mouth (51, 72) and an inner mouth (52, 71); in that at least the inlets have a decreasing variation in section in the direction of air circulation inside them, producing an increase in velocity, and a decrease in the pressure and temperature of air circulating therethrough; and in that said inlets (5) and outlets (7) are curved and facing an oblique direction with respect to the radial direction of the container, so that the air describes between the inlets (5) and the outlets (7) of an upward helicoidal path around the canister (4).

2. System according to claim 1, characterized in that the outer mouth (51, 72) and the inner mouth (52, 71) of the same air inlet (5) or outlet (7) are laterally out of alignment.

3. System according to claim 1, characterized in that the outer mouth (51, 72) and the inner mouth (52, 71) of the same air inlet (5) or outlet (7) are arranged geometrically at different elevation or height.

4. System according to claim 1, characterized in that the casing (1) of the container (C) comprises at least:
- an outer shell (11) of steel;
- a high-density concrete layer (14), specialised in shielding gamma radiation and partially reducing the energy of a neutron radiation, and which includes in its dosing high-density aggregates and;
- a concrete layer (15), which reduces the energy of a neutron radiation (thermalisation) and absorbs much of it; and which includes in its dosage aggregates with high hydrogen content and aggregates with a neutron absorber.

5. System according to claim 4, characterized in that the casing (1) of the container (C) comprises several shells: an outer one (11), an inner one (12) and an intermediate one (13), of steel, which are concentric and form a permanent formwork for the concrete layers (15).

6. System according to claim 4, characterized in that the base (2) has a peripheral portion with a structure analogous to the wall of the casing (1) and has a closing plate (21) forming a suitable surface for the support of the canister (4).

7. System according to claim 4, characterized in that the cover (3) is made of a metal structure containing the air outlets (7) and forms a permanent formwork for the phased differentiated concreting thereof, with concretes specialised against radiations.

\* \* \* \* \*